United States Patent
Xiao (10) Patent No.: US 11,295,774 B1
(45) Date of Patent: Apr. 5, 2022

(54) DATA STORAGE DEVICE CALIBRATING FLY HEIGHT ACTUATOR FOR MULTIPLE HEADS DURING A REVOLUTION

(71) Applicant: Western Digital Technologies, Inc., San Jose, CA (US)

(72) Inventor: Sandy Xianghui Xiao, San Diego, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 17/345,149

(22) Filed: Jun. 11, 2021

(51) Int. Cl.
    *G11B 5/55* (2006.01)
    *G11B 5/60* (2006.01)

(52) U.S. Cl.
    CPC .................. *G11B 5/6011* (2013.01)

(58) Field of Classification Search
    CPC .............. G11B 5/6052; G11B 11/0515; G11B 2005/0021; G11B 5/6029; G11B 5/54; G11B 5/5547; G11B 5/59633; G11B 5/559627; G11B 5/5552; G11B 5/5556; G11B 5/556; G11B 5/5534
    USPC ........ 360/75, 69, 77.02, 77.05, 77.11, 78.04, 360/78.03, 78.09
    See application file for complete search history.

(56) References Cited

U.S. PATENT DOCUMENTS

| | | | |
|---|---|---|---|
| 7,342,736 B1 | 3/2008 | Turner et al. | |
| 8,526,133 B2 | 9/2013 | Xia et al. | |
| 8,773,802 B1 * | 7/2014 | Anderson | G11B 5/6029 360/55 |
| 8,773,807 B1 | 7/2014 | Chia et al. | |
| 8,879,188 B1 * | 11/2014 | Chia | G11B 5/6029 360/55 |
| 9,053,749 B1 | 6/2015 | Haralson et al. | |
| 9,076,474 B1 | 7/2015 | Tang et al. | |
| 9,502,063 B1 | 11/2016 | Zhu et al. | |

* cited by examiner

*Primary Examiner* — Nabil Z Hindi
(74) *Attorney, Agent, or Firm* — Patterson & Sheridan, LLP; Steven H. Versteeg (57) ABSTRACT

A data storage device is disclosed comprising a first head actuated radially over a first disk surface, and a second head actuated radially over a second disk surface. A seek operation seeks the first head to a first fly height calibration track and seeks the second head to a second fly height calibration track. During a revolution of the first and second disk surfaces the first head is used to read the first fly height calibration track in order to calibrate a first fly height actuator for the first head, and after switching from the first head to the second head, the second head is used to read the second fly height calibration track in order to calibrate a second fly height actuator for the second head.

19 Claims, 5 Drawing Sheets

DATA STORAGE DEVICE CALIBRATING FLY HEIGHT ACTUATOR FOR MULTIPLE HEADS DURING A REVOLUTION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
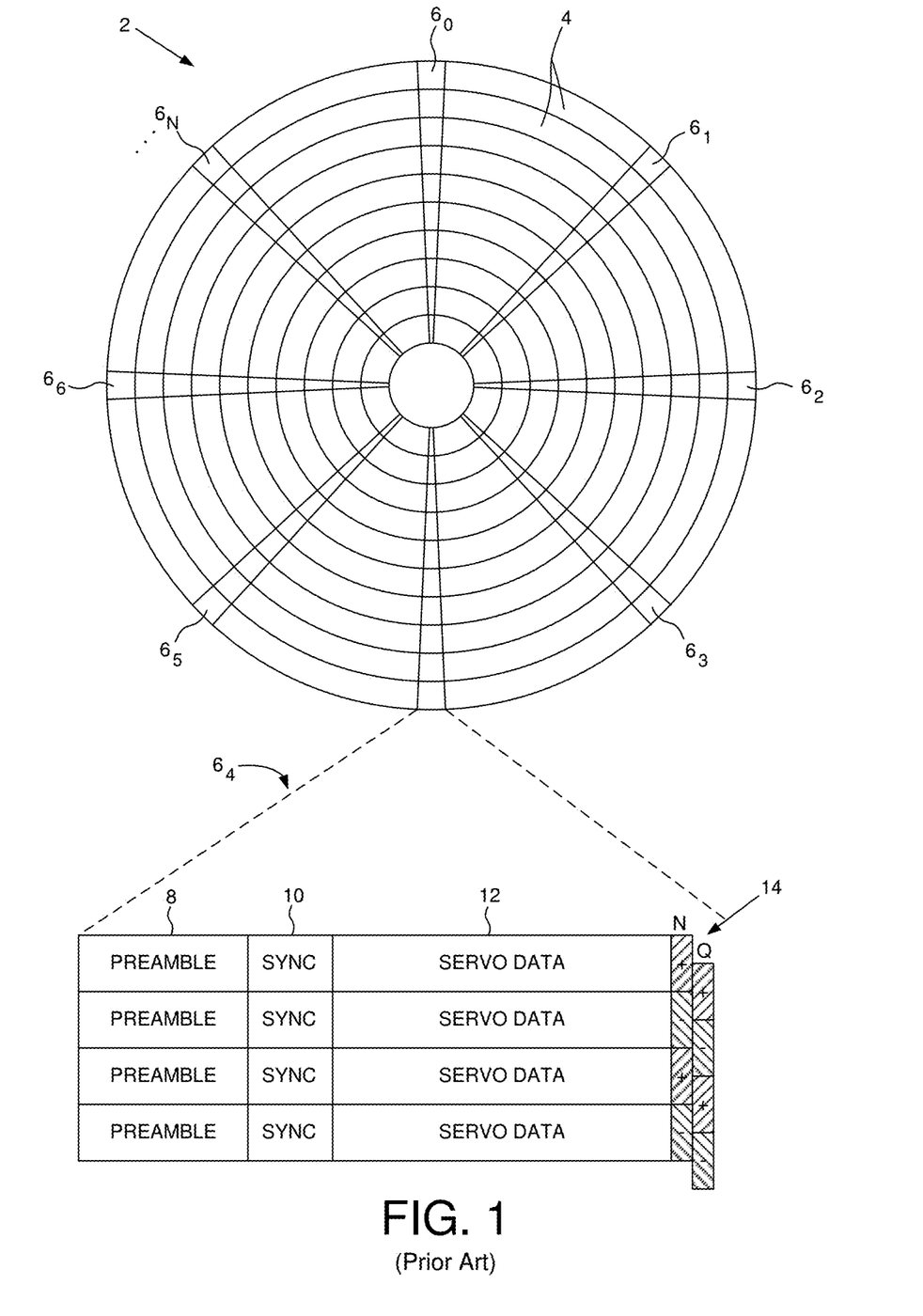
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector 6$i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6$i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable fly height actuator (FHA) may be employed, such as a heater which controls fly height through thermal expansion, or a piezoelectric (PZT) actuator. A data storage device may also employ dual FHAs to achieve a first fly height during write operations and second, different fly height during read operations. The FHA for each head is typically calibrated periodically over time (at power on or after a predetermined operating interval) in order to compensate for change in operating conditions, such as change in environmental conditions (e.g., ambient temperature) or change in head tribology (e.g., picking up lube from the media).

DETAILED DESCRIPTION

Figure 2A:
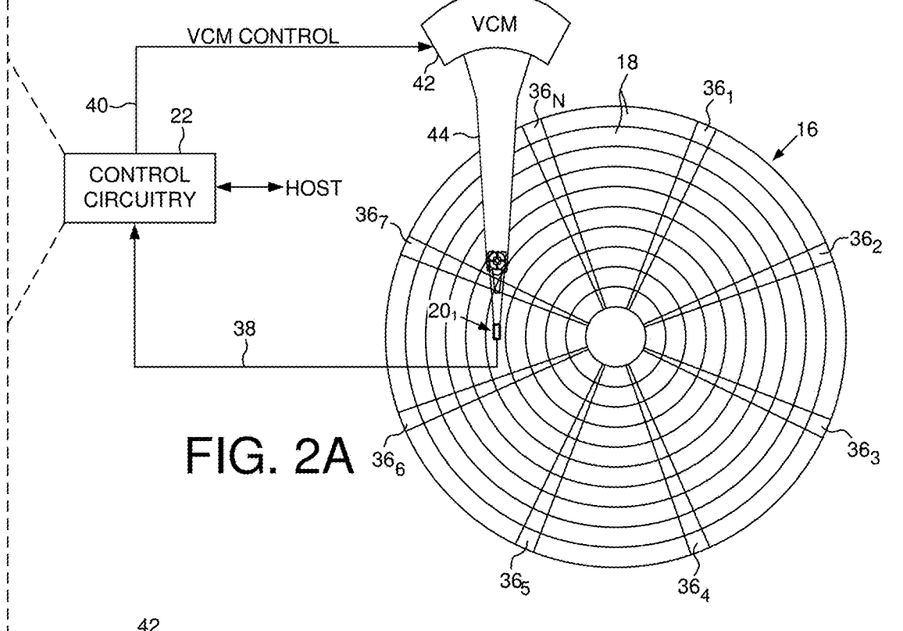
FIGS. 2A and 2B show a data storage device in the form of a disk drive according to an embodiment comprising a plurality of heads actuated over respective disk surfaces.
Figure 2B:
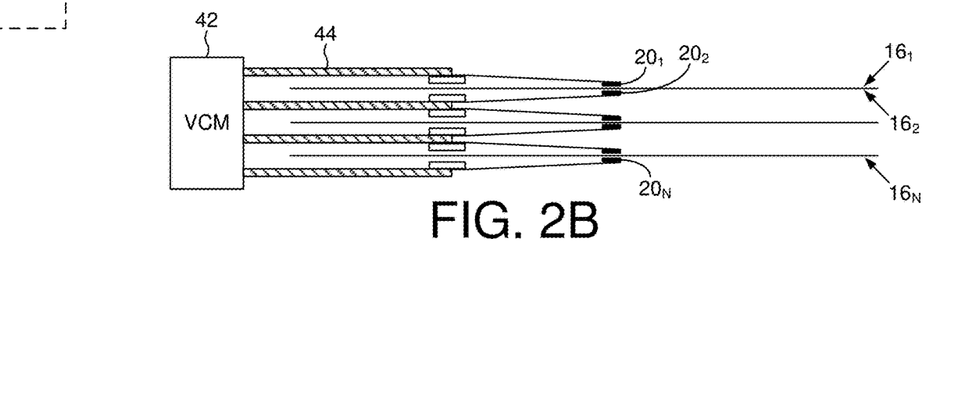
Figure 2C:
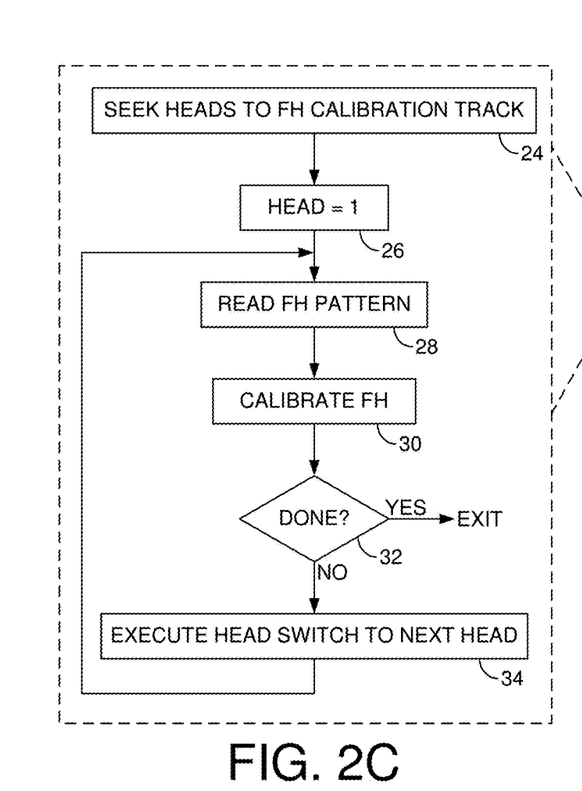
FIG. 2C is a flow diagram according to an embodiment wherein a fly height actuator is calibrated for multiple heads during a revolution of the disk surfaces.

FIGS. 2A and 2B show a data storage device in the form of a disk drive according to an embodiment comprising a first disk surface $16_1$ comprising a plurality of data tracks 18 including a first fly height calibration track. A first head $20_1$ is actuated radially over the first disk surface $16_1$, and a first fly height actuator (FIG. 3) is configured to control a fly height of the first head $20_1$ over the first disk surface $16_1$. The disk drive further comprises a second disk surface $16_2$ comprising a plurality of data tracks including a second fly height calibration track, and a second head $20_2$ actuated radially over the second disk surface $16_2$, where a second fly height actuator is configured to control a fly height of the second head $20_2$ over the second disk surface $16_2$. Control circuitry 22 is configured to execute the flow diagram of FIG. 2C in order to calibrate the fly height actuators of each head. A seek is executed to seek the first head to the first fly height calibration track and seek the second head to the second fly height calibration track (block 24). During a revolution of the first and second disk surfaces, the active head is initialized as the first head (block 26) and the first head is used to read the first fly height calibration track (block 28) in order to calibrate the first fly height actuator (block 30). A head switch is execute to switch from the first head to the second head (block 34), and the second head is used to read the second fly height calibration track (block 28) in order to calibrate the second fly height actuator (block 30). The flow diagram of FIG. 2C is repeated by switching through the heads until the fly height actuators for all of the heads have been calibrated (bock 32).

In the embodiment of FIG. 2A, each disk surface comprises a plurality of servo sectors $36_1$-$36_N$ that define a plurality of servo tracks, wherein the data tracks 18 are defined relative to the servo tracks at the same or different radial density. The control circuitry 22 processes a read signal 38 emanating from the head to demodulate the servo sectors and generate a position error signal (PES) representing an error between the actual position of the head and a target position relative to a target track. A servo control system in the control circuitry 22 filters the PES using a suitable compensation filter to generate a control signal 40 applied to a coarse actuator 42 (e.g., VCM) which rotates an actuator arm 44 about a pivot in order to actuate the head radially over the disk in a direction that reduces the PES. The head may also be servoed using a fine actuator, such as a piezoelectric (PZT) actuator, configured to actuate a suspension relative to the actuator arm 44, and/or configured to actuate the head relative to the suspension. The servo sectors $36_1$-$36_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
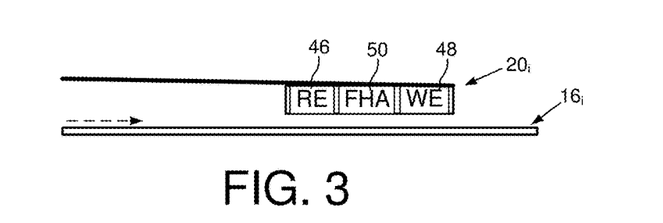
FIG. 3 shows an embodiment wherein each head comprises a suitable fly height actuator.

FIG. 3 shows an embodiment wherein each head 20i comprises a suitable read element 46 (e.g., a magnetoresistive (MR) element), a suitable write element 48 (e.g., an inductive write coil), and a suitable fly height actuator 50 (e.g., a thermal or PZT element). In one embodiment, the fly height actuator 50 may be biased with a calibrated control signal in order to achieve a target fly height, wherein the calibrated control signal may differ between write and read operations. For example, during a write operation the fly height actuator 50 may be calibrated in a manner that compensates for the heating effect of the write element 50 (and optionally the heating effect of an energy assist element such as a laser in heat assisted magnetic recording (HAMR)). In one embodiment, the fly height actuator 50 may be calibrated for write operations by writing/reading a fly height pattern to/from the disk surface in order to compensate for the effect of the write element(s). Once the fly height actuator 50 has been calibrated for write operations, in one embodiment the calibrated control signal may be recalibrated by reading a fly height pattern from the disk surface in order to compensate for changes in tribology of the head, environmental conditions, etc. For example, the calibrated control signal may be adjusted each time the disk drive powers up, exits an idle mode, exceeds an operating interval, etc.

Figure 4A:
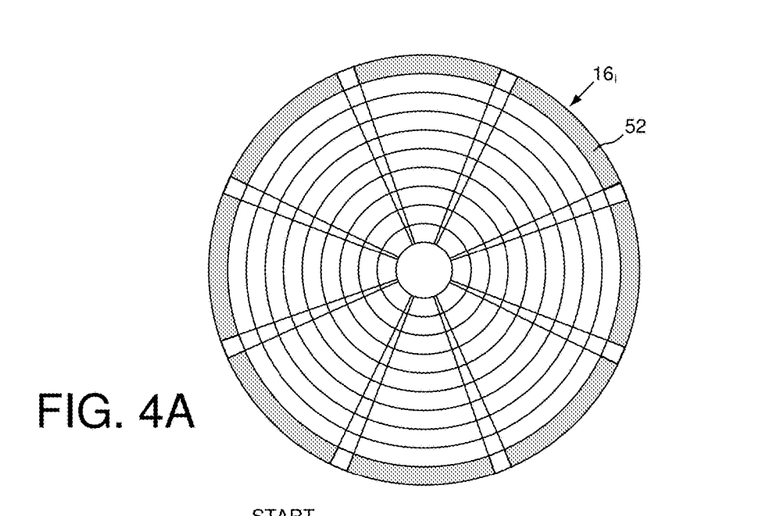
FIG. 4A shows an embodiment wherein each disk surface comprises at least one fly height calibration track.

FIG. 4A shows an embodiment wherein each disk surface 16i may comprise a fly height calibration track 52 at the outer diameter which has recorded therein at least one fly height pattern of magnetic transitions. When recalibrating the control signal for the fly height actuator 50, the control circuitry 22 seeks the heads to the fly height calibration track 52 in order to read the fly height pattern, measure the respective fly height of each head, and make a corresponding adjustment to the control signal. In one embodiment, each disk surface 16i may comprise a number of fly height calibration tracks 52 dispersed across the disk surface 16i at a predetermined radial spacing in order to reduce the seek distance when seeking to a fly height calibration track 52.

Figure 4B:
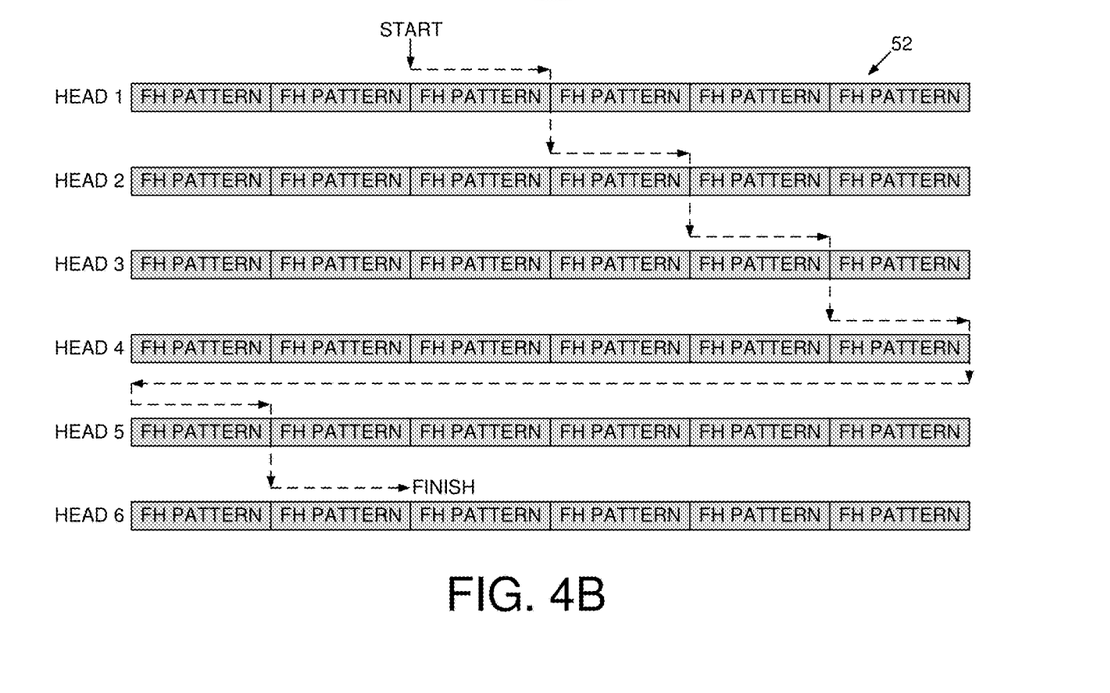
FIG. 4B shows an embodiment wherein during a revolution of the disk surfaces the fly height actuator is calibrated for multiple heads by reading the fly height calibration track and switching heads during the revolution.

FIG. 4B shows an embodiment wherein the fly height actuator 50 for multiple heads may be calibrated during a revolution of the disk surfaces in order to expedite the calibration procedure. In this example, the disk drive comprises three disks having a top and bottom head actuated over the top and bottom disk surfaces (for a total of six heads as shown in FIG. 2B). In one embodiment, the control circuitry 22 is configured to process the read signal 38 from a single head at a time while reading the fly height pattern (FH pattern) from the fly height calibration track 52, wherein after calibrating the fly height actuator 50 for the current head the control circuitry 22 switches to the next head in order to read the FH pattern from the fly height calibration track of the respective disk surface. In the embodiment of FIG. 4B, the FH pattern comprises a repeating pattern of magnetic transitions, wherein a predetermined length of the FH pattern is read in order to calibrate the fly height actuator 50. FIG. 4B shows an example wherein after seeking the heads to the fly height calibration track, the control circuitry 22 configures the first head $20_1$ (HEAD 1) to read the FH pattern from the first disk surface $16_1$. After reading a sufficient length of the FH pattern needed to calibrate the fly height actuator 50 for the first head $20_1$, the control circuitry 22 switches to the second head $20_2$ (HEAD 2) to read the FH pattern from the second disk surface $16_2$. This process of reading the FH pattern to calibrate the fly height actuator 50 of a current head and then switching to the next head continues until the fly height actuator 50 has been calibrated for all of the heads. In the example of FIG. 4B, the fly height actuator for all six heads of the disk drive may be calibrated over a single revolution of the disk surfaces which expedites the calibration process as compared to calibrating the fly height actuator 50 for each head over a respective full revolution of each disk surface. In another embodiment, the fly height actuator 50 for less than all of the heads may be calibrated over a single revolution of the disk surfaces. For example, in one embodiment the fly height actuator 50 for three of the heads may be calibrated over a revolution of the disk surfaces, thereby requiring two revolutions to calibrate the fly height actuator 50 for six heads.

In the example of FIG. 4B, the fly height actuator 50 is shown as being calibrated after reading a constant length of the FH pattern for each head. In another embodiment, the length of the FH pattern read in order to calibrate the fly height actuator 50 may vary for each head. For example in an embodiment described below, the calibration of the fly height actuator 50 may be verified before switching to the next head. If the verification of the calibration fails, the control circuitry 22 may continue to read the FH pattern and calibrate the fly height actuator 50 for the current head until the calibration is verified.

Figure 5A:
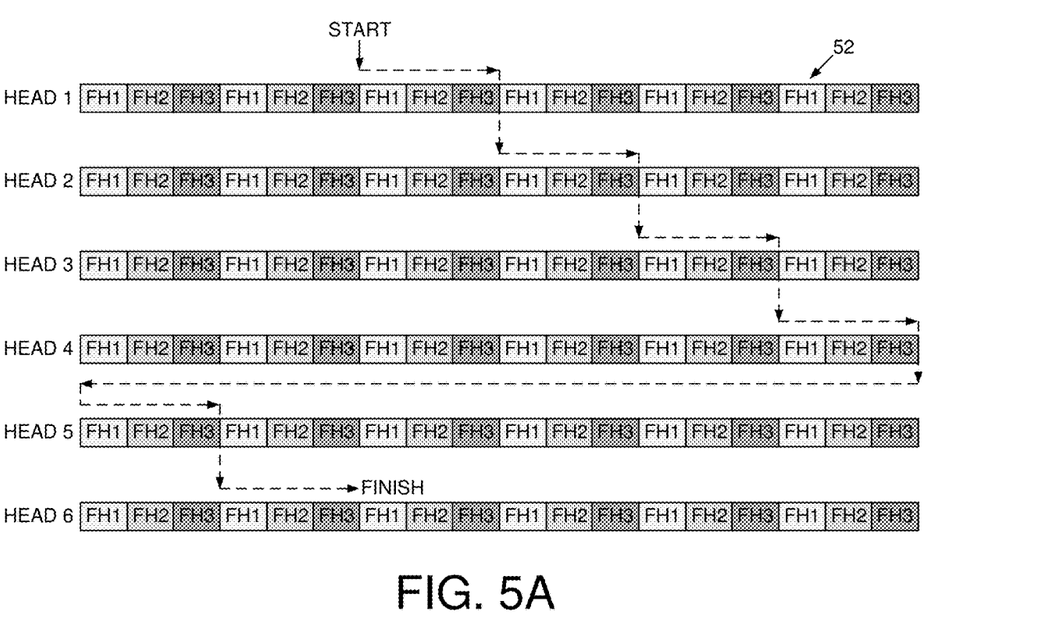
FIG. 5A shows an embodiment wherein each fly height calibration track comprises multiple calibration patterns that are repeated around the circumference of the fly height calibration track.
Figure 5B:
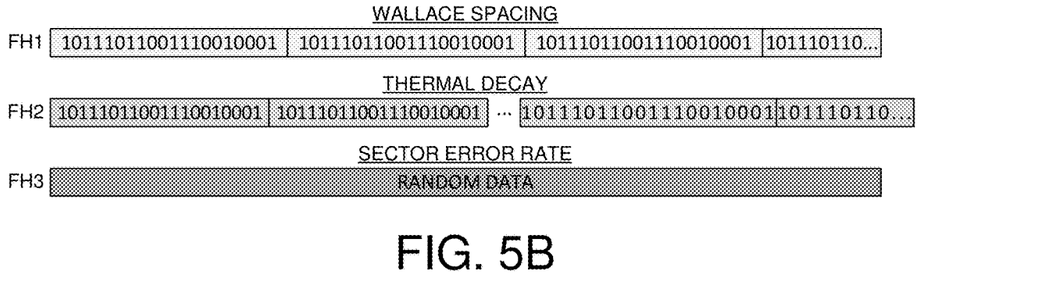
FIG. 5B shows an embodiment wherein the fly height calibration patterns comprise a Wallace spacing pattern, a thermal decay pattern, and a verification pattern.

The FH pattern shown in FIG. 4B may comprise any suitable pattern, and in one embodiment shown in FIG. 5A, the FH pattern shown in FIG. 4B may comprise a plurality of different repeating patterns of magnetic transitions (FH1, FH2, and FH3). For example in an embodiment shown in FIG. 5B, the FH pattern of FIG. 4B may comprise a first FH pattern (FH1) comprising a repeating pattern of magnetic transitions wherein the fly height of the head may be measured using a Wallace spacing technique which measures a ratio of harmonics in the read signal (e.g., 2T and 4T) when reading the FH1 pattern. The FH pattern of FIG. 4B may further comprise a second FH pattern (FH2) comprising the same repeating pattern of magnetic transitions as FH1 but having two segments written at a different linear density (e.g., a first segment written at 120% of the linear density of FH1 followed by a second segment written at 80% of the linear density of FH1). In one embodiment, the FH2 pattern such as shown in FIG. 5B helps compensate for a thermal decay of the FH2 pattern over time when measuring the fly height. An example embodiment for generating the fly height measurement in a manner that compensates for thermal decay of the fly height pattern is disclosed in U.S. Pat. No. 9,076,474 entitled "DATA STORAGE DEVICE ATTENUATING THERMAL DECAY EFFECT ON FLY HEIGHT MEASUREMENT," the disclosure of which is incorporated herein by reference. In one embodiment, the fly height measurement generated by reading the FH1 pattern may be averaged with the fly height measurement generated by reading the FH2 pattern in order to generate a final fly height measurement used to calibrate the fly height actuator 50.

In the embodiment of FIG. 5B, after calibrating the fly height actuator 50 for a current head (e.g., based on the fly height measurement from FH1 and FH2), the control circuitry 22 may verify the calibration by measuring a quality metric of the read signal while reading a third fly height pattern (FH3) comprising a random pattern of magnetic transitions. Any suitable quality metric may be measured while reading the FH3 pattern, such as an accumulated timing error, an accumulated signal sample error, an accumulated branch metric of a data detector (e.g., log likelihood ratio), a number of iterations of a data detector, an accumulated bit error rate of a data detector, etc. When the measured quality metric of the read signal exceeds a threshold, the control circuitry 22 switches to the next head as described above, whereas when the quality metric is below the threshold, the control circuitry 22 continues reading the FH1 and FH2 patterns in order to calibrate the fly height actuator of the current head until the current head passes the verification process.

In the embodiment of FIG. 5B, the fly height patterns FH1, FH2, FH3 are interleaved multiple times along the fly height calibration tracks 52 which facilitates the fast sequential calibration of the fly height actuators by switching from head to head during a revolution of the disk surfaces. In addition when the control circuitry 22 seeks the heads to the fly height calibration tracks 52, the fly height may be measured for the first head when the first head reaches the first FH1 pattern as the disk surface rotates (i.e., repeating the FH1, FH2, FH3 patterns helps minimize the rotational latency to reach the first FH1 pattern after the seek).

Figure 6A:
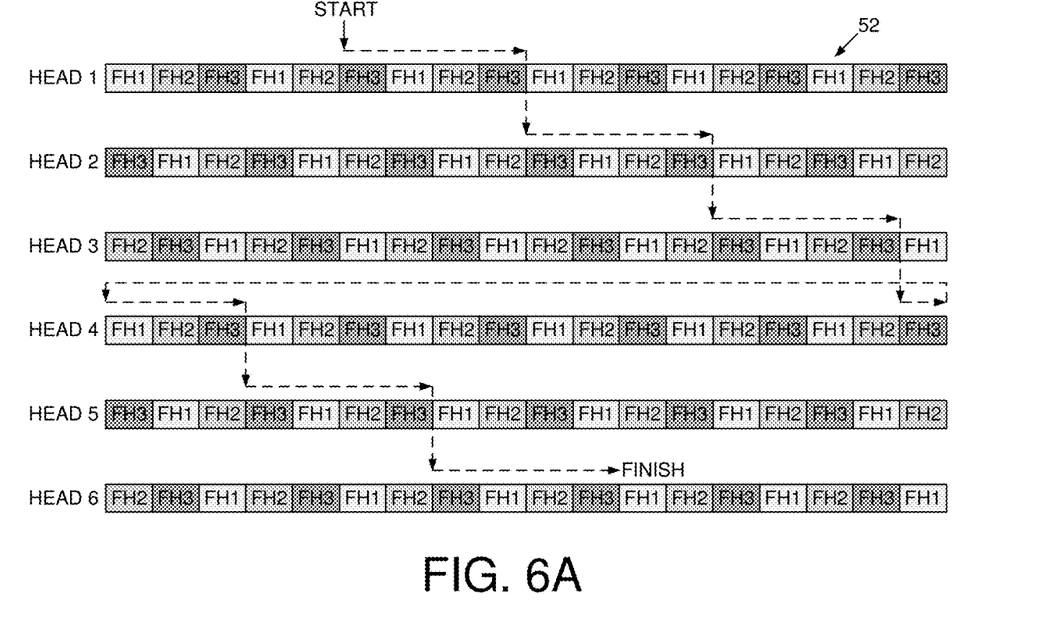
FIG. 6A shows an embodiment wherein the fly height calibration patterns are offset relative to each disk surface to facilitate a settle interval after switching heads.

FIG. 6A shows an embodiment wherein the fly height patterns in each fly height calibration track are offset relative to one another along the length of the tracks in order to compensate for a settle interval after switching to the next head. For example, when switching from HEAD 1 to HEAD 2 the offset of the fly height patterns FH1, FH2, FH3 are written such that HEAD 2 is over the FH3 pattern after the head switch which enables HEAD 2 to settle onto the fly height calibration track before reading the FH1 pattern. Similarly when switching from HEAD 2 to HEAD 3, the fly height patterns are written such that HEAD 3 is over the FH3 pattern after the head switch, and so on.

In the example of FIG. 6A, the calibration of the fly height actuators begins with HEAD 1 and sequences through to HEAD 6. In one embodiment, the heads may be processed in this sequency when HEAD 1 is over the FH3 pattern after seeking the heads to the fly height calibration tracks 52. In another embodiment, the heads may be processed in a different sequence depending on the location of heads relative to the fly height patterns FH1, FH2, FH3 at the end of the seek (i.e., relative to the rotational angle of the disk surfaces at the end of the seek). For example, when HEAD 2 is over the FH3 pattern after seeking the heads to the fly height calibration tracks, HEAD 2 may be processed first, followed by HEAD 3 and so on finishing with HEAD 1.

In the embodiments described above, the FH1, FH2, FH3 patterns may be written with any suitable length and written any suitable number of times within the fly height calibration track. In one embodiment, the length of the patterns may be different relative to one another (e.g., FH3 may be longer than FH1 or FH2).

Figure 6B:
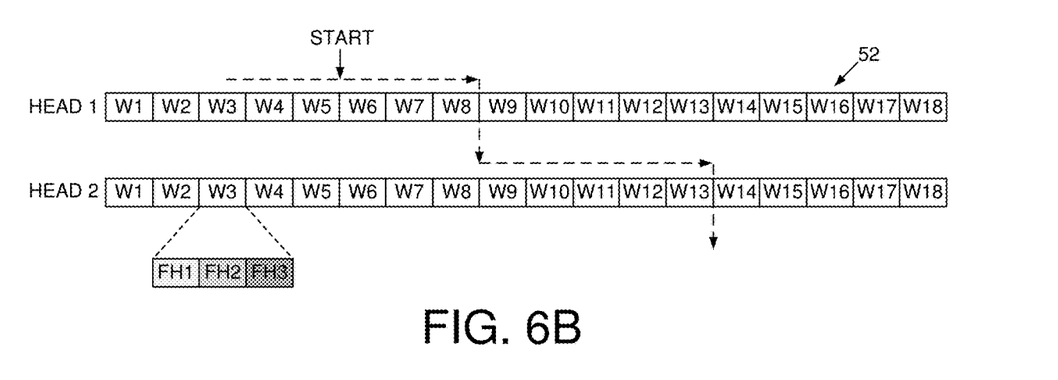
FIG. 6B shows an embodiment wherein multiple fly height calibration patterns may be written to each data wedge, the settle interval after a head switch requires multiple data wedges, and the fly height calibration requires multiple data wedges.

FIG. 6B shows an embodiment wherein the FH1,FH2, FH3 patterns are written within each data wedge of FIG. 4A (where a data wedge is the recordable area between consecutive servo sectors). In this example when the heads seek to the fly height calibration tracks 52, they arrive at data wedge 3 (W3) and require two wedges of settle interval (W4 and W5) before starting the fly height calibration of HEAD 1 by reading FH1 in W6. Also in this example, the fly height calibration of HEAD 1 requires reading three wedges of the FH1,FH2,FH3 pattern (W6, W7 and W8). After switching to HEAD 2, the settle interval requires two wedges (W9 and W10) before starting the fly height calibration at W11. The fly height calibration of HEAD 2 in this example also requires three wedges (W11, W12, and W13) before switching to HEAD 3, and so on. In one embodiment, the number of wedges required for the settle interval may vary from head to head, and the number of wedges required to calibrate the fly height actuator for each head may vary from head to head as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC).

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a first disk surface comprising a plurality of data tracks including a first fly height calibration track;
    a first head actuated radially over the first disk surface;
    a first fly height actuator configured to control a fly height of the first head over the first disk surface;
    a second disk surface comprising a plurality of data tracks including a second fly height calibration track;
    a second head actuated radially over the second disk surface;
    a second fly height actuator configured to control a fly height of the second head over the second disk surface; and
    control circuitry configured to:
        seek the first head to the first fly height calibration track and seek the second head to the second fly height calibration track;
        during a revolution of the first and second disk surfaces:
            use the first head to read the first fly height calibration track in order to calibrate the first fly height actuator;
            switch from the first head to the second head; and
            use the second head to read the second fly height calibration track in order to calibrate the second fly height actuator.

2. The data storage device as recited in claim 1, wherein using the first head to read the first fly height calibration track comprises:
    using the first head to read a first calibration pattern from the first fly height calibration track in order to calibrate the first fly height actuator; and
    using the first head to read a second calibration pattern form the first fly height calibration track in order to verify the calibration of the first fly height actuator.

3. The data storage device as recited in claim 2, wherein:
    the first calibration pattern comprises a repeating pattern of magnetic transitions; and
    the second calibration pattern comprises a random pattern of magnetic transitions.

4. The data storage device as recited in claim 3, wherein the control circuitry is further configured to verify the calibration of the first fly height actuator by measuring a quality metric associated with reading the second calibration pattern.

5. The data storage device as recited in claim 4, wherein the quality metric comprises an error rate associated with reading the second calibration pattern.

6. The data storage device as recited in claim 2, wherein the first calibration pattern is interleaved with the second calibration pattern multiple times along the first fly height calibration track.

7. The data storage device as recited in claim 6, wherein:
    the first calibration pattern is interleaved with the second calibration pattern multiple times along the second fly height calibration track; and
    the first and second calibration patterns on the second fly height calibration track are offset along the second fly height calibration track relative to the first and second calibration patterns on the first fly height calibration track.

8. The data storage device as recited in claim 7, wherein the offset compensates for a settle interval after switching from the first head to the second head.

9. A data storage device comprising:
    a first disk surface comprising a plurality of data tracks including a first fly height calibration track;
    a first head actuated radially over the first disk surface;
    a first fly height actuator configured to control a fly height of the first head over the first disk surface; and
    control circuitry configured to:
        seek the first head to the first fly height calibration track;
        during a revolution of the first disk surface:
            use the first head to read a first calibration pattern from the first fly height calibration track in order to calibrate the first fly height actuator; and
            use the first head to read a second calibration pattern from the first fly height calibration track in order to verify the calibration of the first fly height actuator, wherein:
                the first calibration pattern comprises a repeating pattern of magnetic transitions; and
                the second calibration pattern comprises a random pattern of magnetic transitions.

10. The data storage device as recited in claim 9, wherein the control circuitry is further configured to verify the calibration of the first fly height actuator by measuring a quality metric associated with reading the second calibration pattern.

11. The data storage device as recited in claim 10, wherein the quality metric comprises an error rate associated with reading the second calibration pattern.

12. A data storage device comprising:
    a first disk surface comprising a plurality of data tracks including a first fly height calibration track;
    a first head actuated radially over the first disk surface;
    a first fly height actuator configured to control a fly height of the first head over the first disk surface; and
    control circuitry configured to:
        seek the first head to the first fly height calibration track;
        during a revolution of the first disk surface:
            use the first head to read a first calibration pattern from the first fly height calibration track in order to calibrate the first fly height actuator; and
            use the first head to read a second calibration pattern from the first fly height calibration track in order to verify the calibration of the first fly height actuator, wherein the first calibration pattern is interleaved with the second calibration pattern multiple times along the first fly height calibration track.

13. The data storage device as recited in claim 12, further comprising:
  a second disk surface comprising a plurality of data tracks including a second fly height calibration track;
  a second head actuated radially over the second disk surface; and
  a second fly height actuator configured to control a fly height of the second head over the second disk surface,
  wherein during the revolution of the first disk surface the control circuitry is further configured to:
    switch from the first head to the second head;
    use the second head to read the first calibration pattern from the second fly height calibration track in order to calibrate the second fly height actuator; and
    use the second head to read the second calibration pattern form the second fly height calibration track in order to verify the calibration of the second fly height actuator.

14. The data storage device as recited in claim 13, wherein:
  the first calibration pattern is interleaved with the second calibration pattern multiple times along the second fly height calibration track; and
  the first and second calibration patterns on the second fly height calibration track are offset along the second fly height calibration track relative to the first and second calibration patterns on the first fly height calibration track.

15. The data storage device as recited in claim 14, wherein the offset compensates for a settle interval after switching from the first head to the second head.

16. A data storage device comprising:
  a first disk surface comprising a plurality of data tracks including a first fly height calibration track;
  a first head actuated radially over the first disk surface;
  a first fly height actuator configured to control a fly height of the first head over the first disk surface;
  a second disk surface comprising a plurality of data tracks including a second fly height calibration track;
  a second head actuated radially over the second disk surface;
  a second fly height actuator configured to control a fly height of the second head over the second disk surface; and
  a means for seeking the first head to the first fly height calibration track and seek the second head to the second fly height calibration track;
  during a revolution of the first and second disk surfaces:
    a means for using the first head to read the first fly height calibration track in order to calibrate the first fly height actuator;
    a means for switching from the first head to the second head; and
    a means for using the second head to read the second fly height calibration track in order to calibrate the second fly height actuator.

17. The data storage device as recited in claim 16, wherein the means for using the first head to read the first fly height calibration track comprises:
  a means for using the first head to read a first calibration pattern from the first fly height calibration track in order to calibrate the first fly height actuator; and
  a means for using the first head to read a second calibration pattern form the first fly height calibration track in order to verify the calibration of the first fly height actuator.

18. The data storage device as recited in claim 17, wherein:
  the first calibration pattern comprises a repeating pattern of magnetic transitions; and
  the second calibration pattern comprises a random pattern of magnetic transitions.

19. The data storage device as recited in claim 18, further comprising a means for verifying the calibration of the first fly height actuator by measuring a quality metric associated with reading the second calibration pattern.

* * * * *